(12) United States Patent
McKenzie

(10) Patent No.: US 9,643,689 B1
(45) Date of Patent: May 9, 2017

(54) CHAIR LIFT FOR BOATS

(71) Applicant: Michael McKenzie, Meredith, NH (US)

(72) Inventor: Michael McKenzie, Meredith, NH (US)

( * ) Notice: Subject to any disclaimer, the term of this patent is extended or adjusted under 35 U.S.C. 154(b) by 0 days.

(21) Appl. No.: 14/629,567

(22) Filed: Feb. 24, 2015

(51) Int. Cl.
*B66C 23/52* (2006.01)
*B63B 27/16* (2006.01)
*B63B 27/36* (2006.01)
*H02P 7/08* (2006.01)

(52) U.S. Cl.
CPC .............. *B63B 27/16* (2013.01); *B63B 27/36* (2013.01); *H02P 7/08* (2013.01); *B66C 23/52* (2013.01)

(58) Field of Classification Search
None
See application file for complete search history.

(56) References Cited

U.S. PATENT DOCUMENTS

| | | | | |
|---|---|---|---|---|
| 2,290,384 A | * | 7/1942 | Rowe | B66C 23/36 212/262 |
| 2,998,148 A | | 8/1961 | Himel, Jr. | |
| 3,667,632 A | * | 6/1972 | Tidswell | B66C 23/48 414/680 |
| 4,554,691 A | * | 11/1985 | Daugherty | A61G 7/1017 318/16 |
| 5,160,286 A | | 11/1992 | Hill | |
| 5,366,028 A | | 11/1994 | Kobayashi | |
| 5,709,154 A | | 1/1998 | Schott | |
| 5,934,490 A | * | 8/1999 | Mora | B25H 1/0007 212/176 |
| 7,162,969 B2 | | 1/2007 | Houlder | |
| 7,370,598 B1 | | 5/2008 | Bootes | |
| 7,618,223 B1 | | 11/2009 | Begley | |

* cited by examiner

*Primary Examiner* — Sang Kim
*Assistant Examiner* — Juan Campos, Jr.

(57) ABSTRACT

The chair lift for boats is a hoist designed to easily move a person with disabilities from a boat into and out of the water. The chair lift for boats comprises a mast, a boom, a hydraulic gantry, a chair, and an optional winch.

2 Claims, 7 Drawing Sheets

CHAIR LIFT FOR BOATS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hoists and handling equipment, more specifically, a vehicle hoist configured for use with boats.

SUMMARY OF INVENTION

The chair lift for boats is a hoist designed to easily move a person with disabilities from a boat into and out of the water. The chair lift for boats comprises a mast, a boom, a hydraulic gantry, a chair, and an optional winch.

These together with additional objects, features and advantages of the chair lift for boats will be readily apparent to those of ordinary skill in the art upon reading the following detailed description of the presently preferred, but nonetheless illustrative, embodiments when taken in conjunction with the accompanying drawings.

In this respect, before explaining the current embodiments of the chair lift for boats in detail, it is to be understood that the chair lift for boats is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the chair lift for boats.

It is therefore important that the claims be regarded as including such equivalent construction insofar as they do not depart from the spirit and scope of the chair lift for boats. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
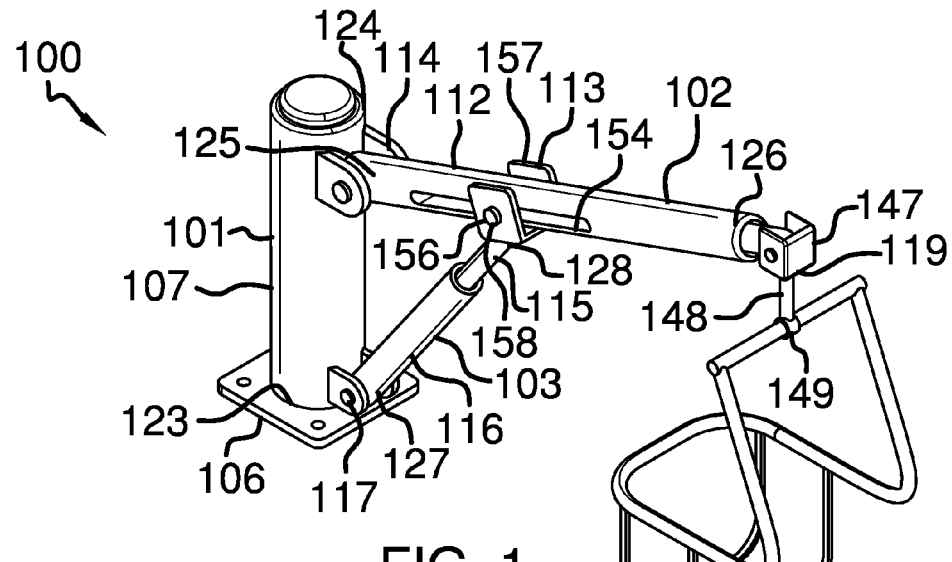
FIG. 1 is a perspective view of an embodiment of the disclosure.
Figure 2:
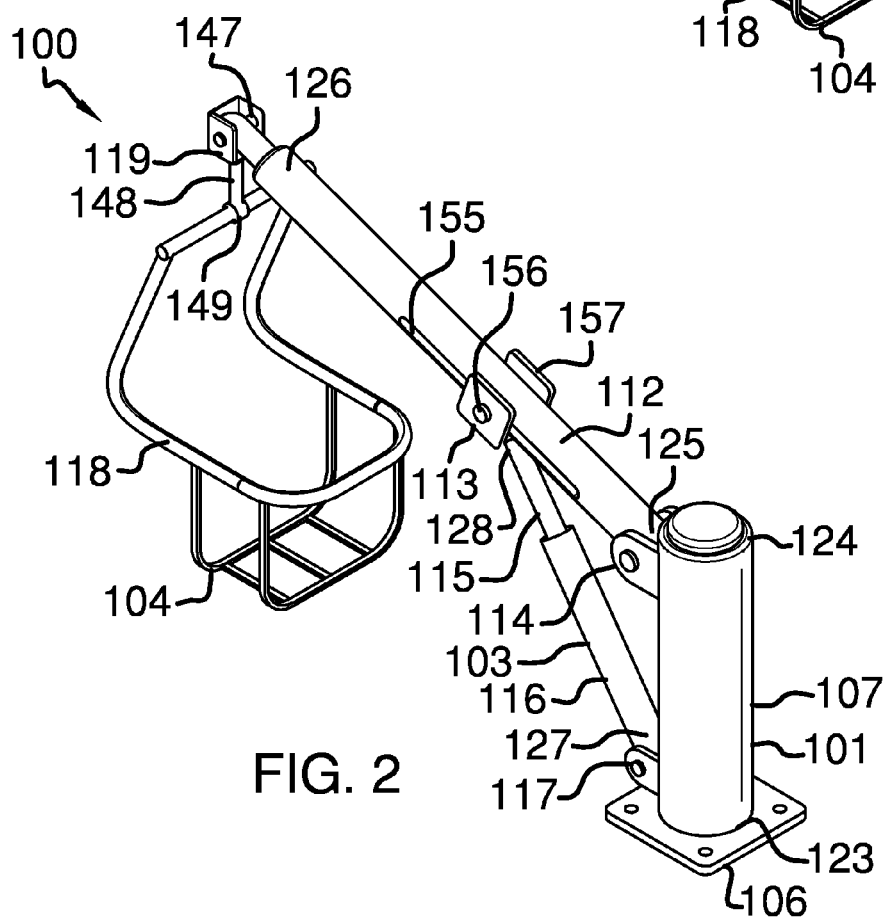
FIG. 2 is an alternate perspective view of an embodiment of the disclosure.
Figure 3:
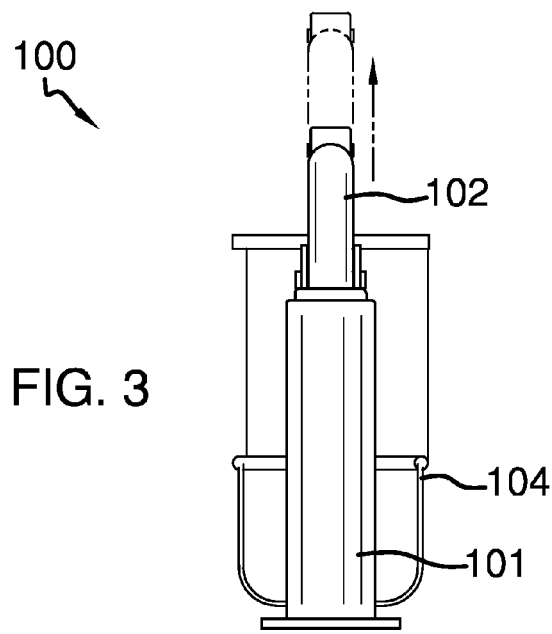
FIG. 3 is a back view of an embodiment of the disclosure.
Figure 4:
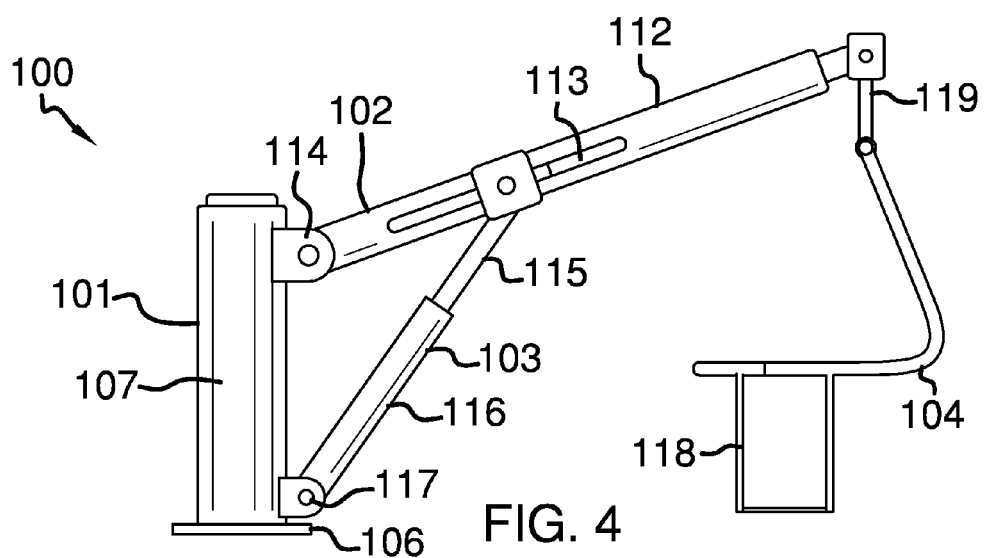
FIG. 4 is a side view of an embodiment of the disclosure.
Figure 5:
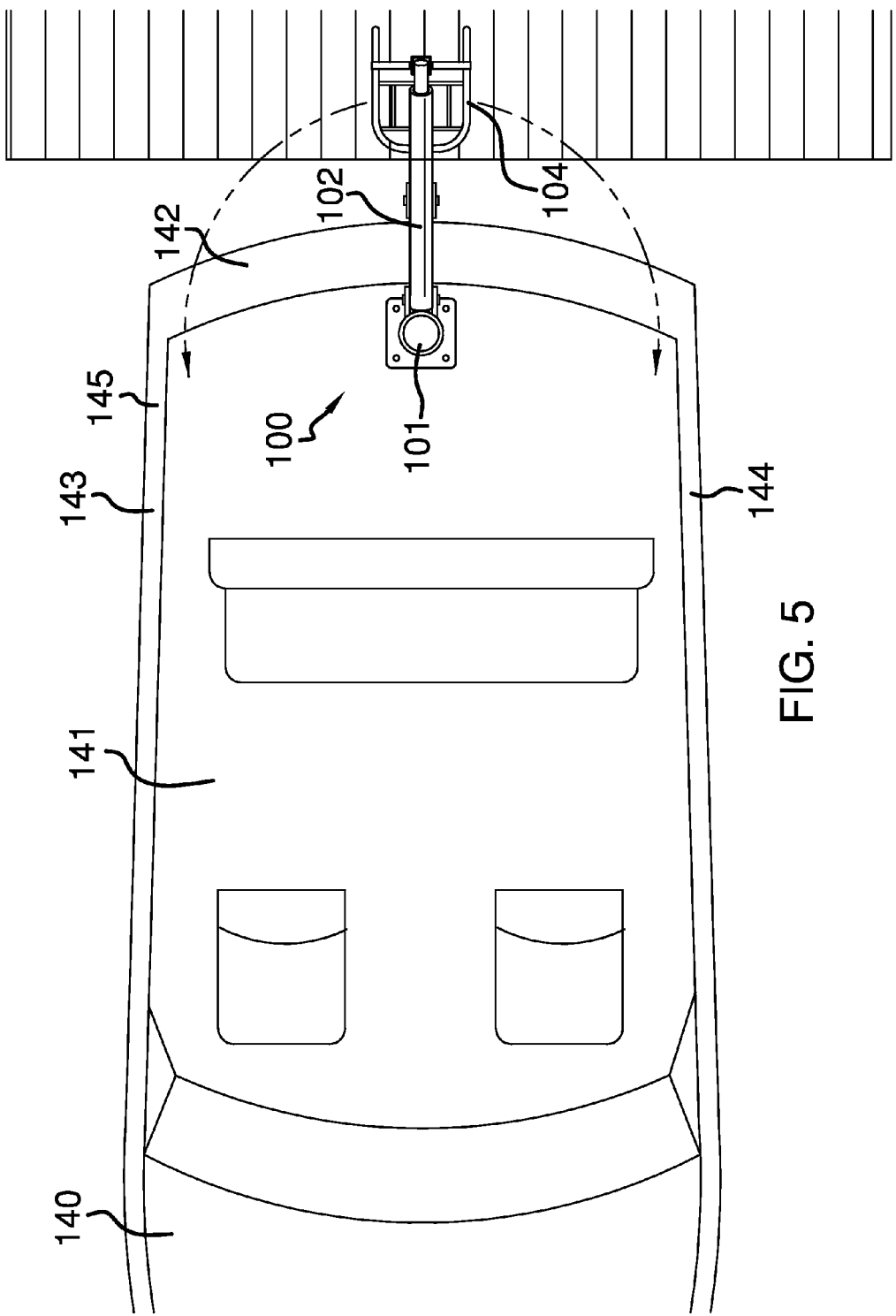
FIG. 5 is a top view of an embodiment of the disclosure.
Figure 6:
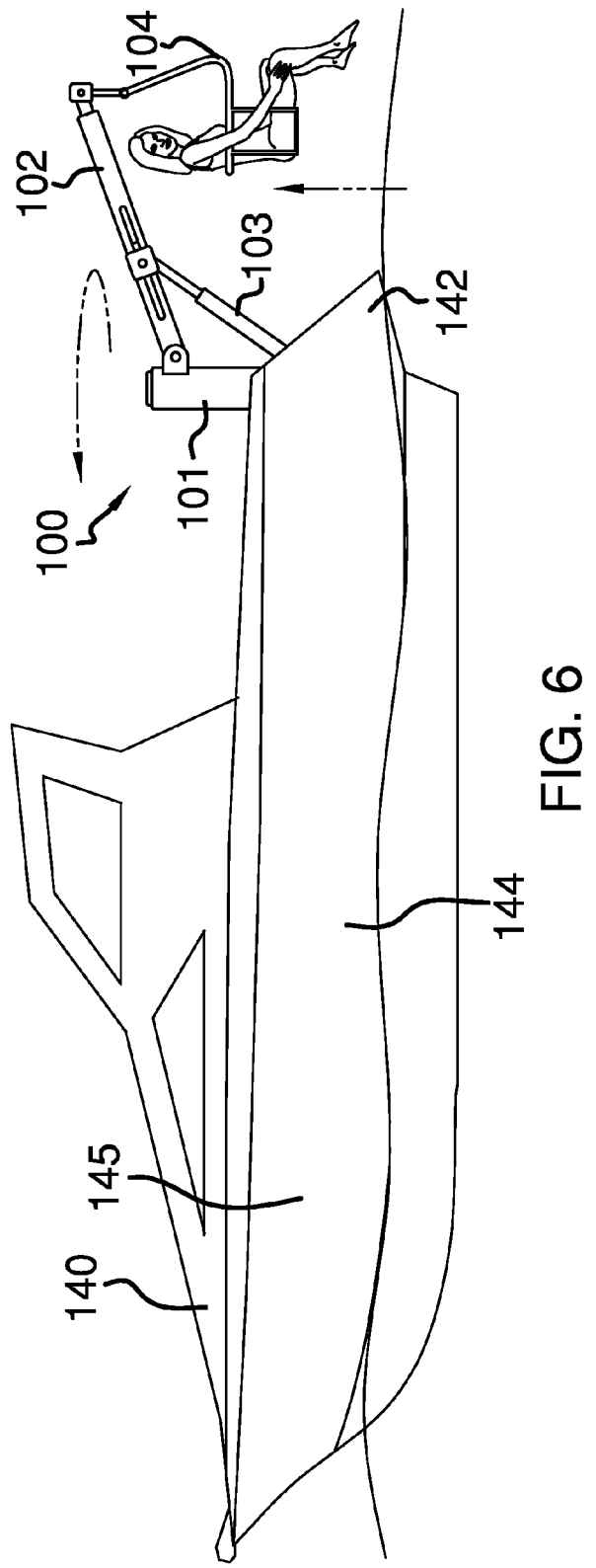
FIG. 6 is an in-use view of an embodiment of the disclosure.
Figure 7:
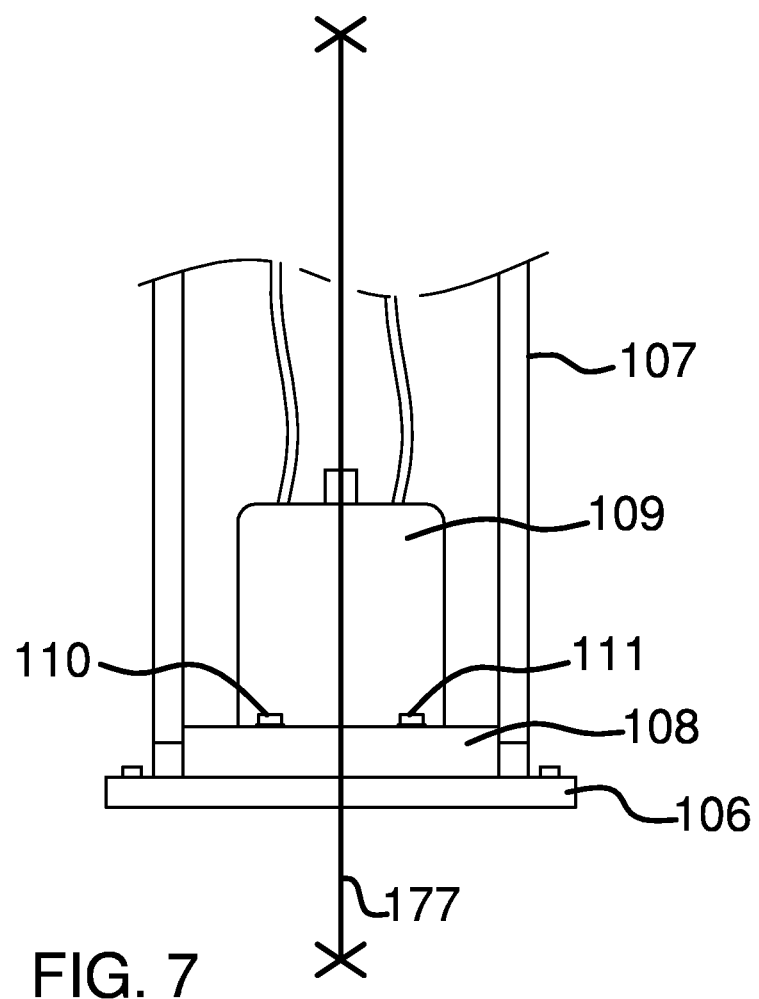
FIG. 7 is a cross-sectional view of an embodiment of the disclosure.
Figure 8:
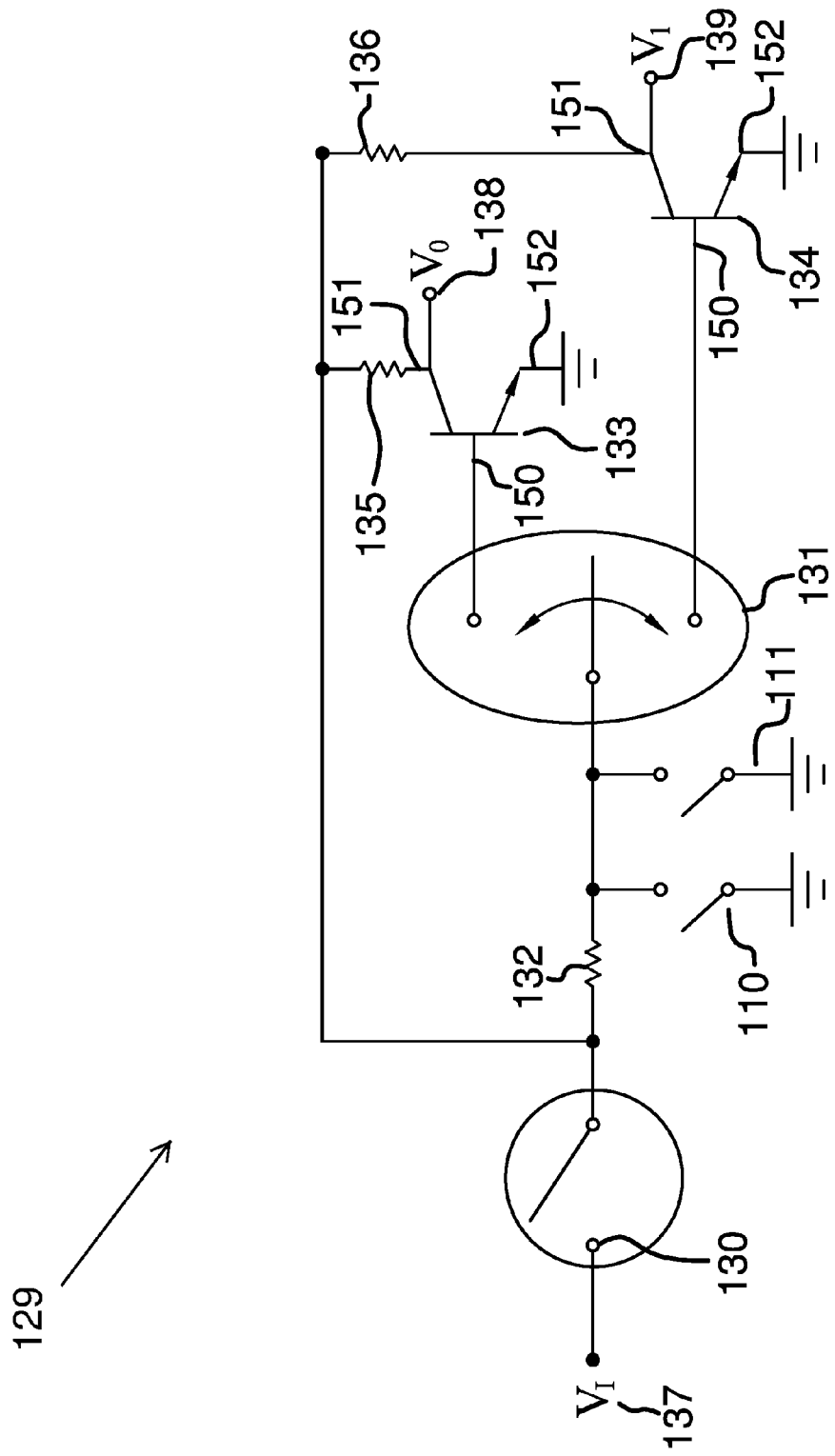
FIG. 8 is a schematic view of an embodiment of the disclosure.
Figure 9:
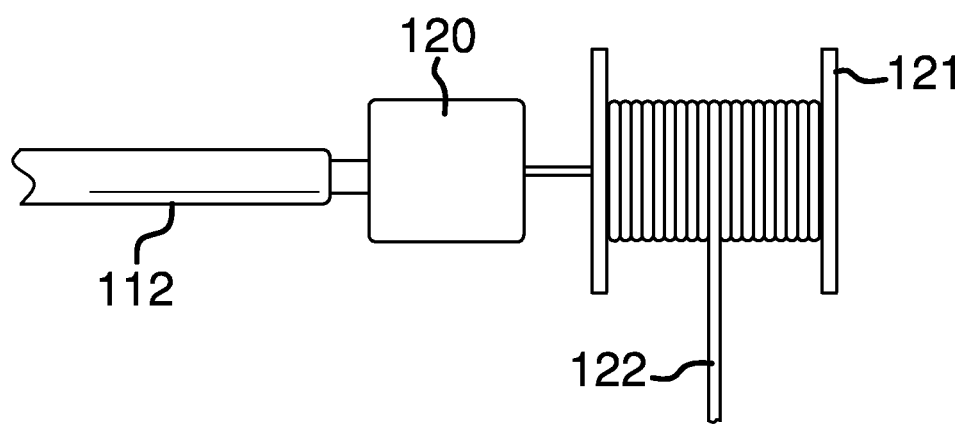
FIG. 9 is a detail view of an alternate embodiment of the disclosure.

Detailed reference will now be made to a first potential embodiment of the disclosure, which is illustrated in FIGS. 1 through 9. The chair lift for boats is a hoist for adapted for use with boats that are used as recreational watercraft. The chair lift for boats transports people into and out of the water 146. The chair lift for boats 100 (hereinafter invention) comprises a mast 101, a boom 102, a hydraulic gantry 103, a chair 104, and an optional winch 105.

The mast 101 comprises a base 106, a mast post 107, a bearing ring 108, a mast motor 109, a motor control 129, a first limit switch 110, and a second limit switch 111. The base 106 is a metal plate that is adapted to be mounted on a deck 141 of a boat 140. The bearing ring 108 is mounted on the base 106. The mast post 107 is a hollow cylindrical pipe that that is further defined with a first end 123 and a second end 124. The first end 123 of the mast post 107 is attached to the bearing ring 108 so that the mast post 107 projects perpendicularly from the base 106 in a direction away from the water 146.

The mast motor 109 is an electric motor that is mounted inside the mast post 107 and is adapted to connect to the boat's 140 electrical system. The purpose of the mast motor 109 is to rotate the mast post 107 around a center axis 177. The purpose of the motor control 129 is to send a start and stop signal to the mast motor 109 to turn either clockwise or counter clockwise. The first limit switch 110 and the second limit switch 111 collectively limit the range of rotation of the mast post 107 to between 270 and 330 degrees.

When the mast post 107 rotates to a first predetermined limit, the first limit switch 110 closes to signal to the motor electronics to disconnect the motor. When the mast post 107 rotates to a second predetermined limit, the second limit switch 111 closes to signal to the motor electronics to disconnect the motor.

In the first potential embodiment, the motor control 129 comprises an on off switch 130, a direction switch 131, a limit resistor 132 a clockwise transistor 133, a counter clockwise transistor 134, a clockwise pullup resistor 135, and a counter clockwise pullup resistor 136. The motor control 129 used in the first potential embodiment of the disclosure is adapted to use an external electric voltage 137 provided by the boat's 140 electrical system.

The motor control 129 is used to provide a first signal 138 to the mast motor 109 instructing the mast motor 109 to turn clockwise, and a second signal 139 to the mast motor 109 instructing it to turn counter clockwise. The on off switch 130 is closed to connect the external electric voltage 137 to the limit resistor 132, the counter clockwise pullup resistor 136, and the clockwise pullup resistor 135. The purpose of the limit resistor 132, the counter clockwise pullup resistor 136, and the clockwise pullup resistor 135 is to limit the flow of current through the motor control 129. The limit resistor 132 is connected to the direction switch 131.

The direction switch 131 is used to route the current coming through the limit resistor 132 to the base 150 connection of either the clockwise transistor 133 or the counter clockwise transistor 134. The clockwise pullup resistor 135 is connected to the collector 151 of the clockwise transistor 133. The counter clockwise pullup resistor 136 is connected to the collector 151 of the counter clockwise transistor 134. The emitter 152 of the clockwise transistor 133 is connected to the electrical ground 153. The emitter 152 of the counter clockwise transistor 134 is connected to the electrical ground 153. The first limit switch 110 and the second limit switch 111 are connected between the limit resistor 132 and the direction switch 131.

To turn the mast motor 109 clockwise, the direction switch 131 is turned to the clockwise position. When the on off switch 130 is closed, the external electrical voltage 137 is applied to the collector 151 of the clockwise transistor 133 through the clockwise pullup resistor 135. The external electrical voltage 137 is also applied to the base 150 connection of the clockwise transistor 133 through the limit resistor 132 and the direction switch 131. This generates the first signal 138 at the collector 151 of the clockwise transistor 133 that instructs the mast motor 109 to turn clockwise. Should the mast motor 109 turn to the point that the first limit switch 110 is closed, the external electrical voltage 137 is shorted to the electrical ground 153, which turns off the first signal 138.

To turn the mast motor 109 counter clockwise, the direction switch 131 is turned to the counter clockwise position. When the on off switch 130 is closed, the external electrical voltage 137 is applied to the collector 151 of the counter clockwise transistor 134 through the counter clockwise pullup resistor 136. The external electrical voltage 137 is also applied to the base 150 connection of the counter clockwise transistor 134 through the limit resistor 132 and the direction switch 131. This generates the second signal 139 at the collector 151 of the counter clockwise transistor 134 that instructs the mast motor 109 to turn counter clockwise. Should the mast motor 109 turn to the point that the second limit switch 111 is closed, the external electrical voltage 137 is shorted to the electrical ground 153 which turns off the second signal 139.

The base 106 and mast post 107 are both made of metal. Suitable metals include, but are not limited to, aluminum or stainless steel. The bearing ring 108, mast motor 109 and associated accessories, motor control 129, first limit switch 110 and second limit switch 111 are commercially available. Motor controls and the use of limit switches are well known and documented in the art.

The boom 102 comprises a boom pole 112, a boom slider 113 and a boom swivel joint 114. The boom pole 112 is a cylindrical pipe that is further defined with a third end 125 and a fourth end 126. The third end 125 of the boom pole 112 is attached to the second end 124 of the mast post 107 using the boom swivel joint 114. The boom swivel joint 114 is a device that allows the boom pole 112 to rotate relative to the mast post 107. The boom pole 112 also has incorporated into it a boom slider 113 that is connected to the hydraulic gantry 103. The boom slider 113 is a mechanical slider that converts the linear motion of the hydraulic gantry 103 into the rotation movement of the boom 102.

In the first potential embodiment of the disclosure, as illustrated in FIGS. 1 through 9, the boom slider 113 comprises a first slot 154, a second slot 155, a center shaft 156 and a cradle 157. The first slot 154 and the second slot 155 are formed into the side of the boom pole 112. The first slot 154 and the second slot 155 are sized to allow the center shaft 156 to fit through the first slot 154 and the second slot 155. The center shaft 156 is further defined with a seventh end 158 and an eighth end 159. The cradle 157 is attached to the hydraulic cylinder 116 and secures the seventh end 158 and eighth end 159 of the center shaft 156. When the hydraulic cylinder 116 extends, the center shaft 156 moves along the first slot 154 and second slot 155, thereby rotating the boom pole 112 away from the water 146.

The boom pole 112, center shaft 156 and cradle 157 are made of metal. Suitable metals include, but are not limited to, aluminum or stainless steel. The boom swivel joint 114 as well as the components for the boom slider 113 are commercially available. Sliders and swivel joints are well known and documented in the art.

The hydraulic gantry 103 comprises a hydraulic cylinder 116 and a gantry swivel joint 117. The hydraulic cylinder 116 is a mechanical device that uses pressurized hydraulic fluid to move a piston 115. In this disclosure, the hydraulic cylinder 116 explicitly includes the fluid pressure systems and the control systems required to operate the hydraulic cylinder 116. The hydraulic cylinder 116 is further defined by a fifth end 127 and a sixth end 128. The fifth end 127 of the hydraulic cylinder 116 is attached to the first end 123 of the mast post 107 using the gantry swivel joint 117. The gantry swivel joint 117 is a device that allows the hydraulic cylinder 116 to rotate relative to the mast post 107. While not strictly required for the operation of the invention 100, the use of the gantry swivel joint 117 will result in smoother operation of the invention 100. The piston 115 moves in a unidirectional manner into and out of the sixth end 128 of the hydraulic cylinder 116. The exposed end of the piston 115 is attached to the cradle 157.

Hydraulic cylinders and their fluid pressure and control systems are well known and documented in the art and are commercially available. Swivel joints are well known and documented in the art and are commercially available. In the first potential embodiment of the disclosure, commercially available hydraulic cylinders and swivel joints were used.

The chair 104 comprises a seat 118 and seat rigging 119. The seat 118 can be a solid seat or a sling seat. The seat rigging 119 comprises a seat swivel joint 147 and hardware. The seat swivel joint 147 is attached to the fourth end 126 of the boom pole 112. The hardware used to attach the seat 118 to the seat swivel joint 147 depends on the specific seat selected. In the first potential embodiment of the disclosure, as illustrated in FIGS. 1 through 9, a first metal bar 148 is attached to the seat swivel joint 147 and is connected to the seat 118 using a T connector 149.

In a second potential embodiment of the disclosure, the optional winch 105 is used to connect the seat 118 to the boom pole 112. The optional winch 105 comprises a winch motor 120, a winch drum 121, a winch line 122, and a control system. The purpose of the optional winch 105 is to allow the optional winch 105 to raise and lower the seat 118 into the water 146 and to give the operator greater flexibility in the use of the invention 100. Winches, including their control systems are commercially available.

To use the invention 100, the person to be transported is placed in the seat 118. The hydraulic cylinder 116 is activated to extend the piston 115 and raise the seat 118 off the deck 141 of the boat 140. The mast motor 109 is operated to rotate the mast post 107 and seat 118 over either the starboard 143 hull 145, port 144 hull 145 or stern 142 hull 145 so that the seat 118 is over the water 146. The hydraulic cylinder 116 is then activated to retract the piston 115 and lower the seat 118 into the water 146. If the optional winch 105 is provided, the optional winch 105 is activated to lower the seat 118 into the water 146. To retrieve a person from the water 146, the above steps are reversed.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A chair lift comprising
a mast, a boom, a hydraulic gantry, and a chair;
wherein the chair lift is adapted for use in boats;
wherein the chair lift is adapted to transport people into and out of water;
wherein a winch is used to connect the chair to a boom pole;
wherein the mast comprises a base, a mast post, a bearing ring, a mast motor, a motor control, a first limit switch and a second limit switch;
wherein the boom comprises the boom pole, a boom slider and a boom swivel joint;
wherein the hydraulic gantry comprises a hydraulic cylinder and a gantry swivel joint;
wherein the chair comprises a seat;
wherein the mast post is further defined with a first end and a second end;
wherein the boom pole is a cylindrical pipe that is further defined with a third end and a fourth end;
wherein the hydraulic cylinder is further defined by a fifth end and a sixth end;
wherein the first end of the mast post is attached to the bearing ring;
wherein the third end of the boom pole is attached to the second end of the mast post using the boom swivel joint;
wherein the fifth end of the hydraulic cylinder is attached to the first end of the mast post using the gantry swivel joint;
wherein the base is a metal plate that is adapted to be mounted on the deck of the boat;
wherein the bearing ring is mounted on the base;
wherein the mast post is a hollow cylindrical pipe;
wherein the mast motor is an electric motor that is mounted inside the mast post and is adapted to connect to the boat's electrical system;
wherein the mast motor rotates the mast post around a center axis;
wherein the motor control sends a first signal to the mast motor to turn either clockwise or counter clockwise;
wherein the motor control sends a second signal to the mast motor to turn either clockwise or counter clockwise;
wherein the rotation of the mast post is limited by a first limit switch;
wherein the rotation of the mast post is limited by a second limit switch;
wherein when the mast post rotates to a first predetermined limit, the first limit switch closes to signal to the motor electronics to disconnect the motor;
wherein when the mast post rotates to a second predetermined limit, the second limit switch closes to signal to the motor electronics to disconnect the motor;
wherein the boom swivel joint is a device that allows the boom pole to rotate relative to the mast post;
wherein the boom pole houses a boom slider that is connected to the hydraulic gantry;
wherein the boom slider slider comprises a first slot, a second slot, a center shaft and a cradle;
wherein the first slot and the second slot are formed into the side of the boom pole;
wherein the first slot and the second slot are sized to allow the center shaft to fit through the first slot and the second slot;
wherein the center shaft is further defined with a seventh end and an eighth end;
wherein the cradle is attached to the seventh end and eighth end of the center shaft;
wherein the hydraulic cylinder is a mechanical device that moves a piston;
wherein the gantry swivel joint is a device that allows the hydraulic cylinder to rotate relative to the mast post;
wherein the piston moves in a unidirectional manner into and out of the sixth end of the hydraulic cylinder;
wherein the exposed end of the piston is attached to the cradle;
wherein the winch comprises a winch motor, a winch drum, a winch line;
wherein the winch is used to raise and lower the seat into the water;
wherein the motor control comprises an on off switch, a direction switch, a limit resistor a clockwise transistor, a counter clockwise transistor, a clockwise pullup resistor, and a counter clockwise pullup resistor;
wherein the motor control is adapted to use an external electric voltage provided by the boat's electrical system.

2. The chair lift according to claim 1 wherein
the on off switch is closed to connect the external electric voltage to the limit resistor, the counter clockwise pullup resistor, and the clockwise pullup resistor;
wherein the limit resistor is connected to the direction switch;

wherein the direction switch is used to route the current coming through the limit resistor to a base connection of the clockwise transistor;

wherein the direction switch is used to route the current coming through the limit resistor to the base connection of the counter clockwise transistor;

wherein an emitter of the clockwise transistor is connected to an electrical ground;

wherein the emitter of the counter clockwise transistor is connected to the electrical ground;

wherein the first limit switch and the second limit switch is connected between the limit resistor and the direction switch;

wherein the first limit switch and the second limit switch is connected to the electrical ground.

* * * * *